United States Patent
Li et al.

(10) Patent No.: US 11,320,570 B2
(45) Date of Patent: May 3, 2022

(54) WAVELENGTH CONVERTING DEVICE

(71) Applicant: DELTA ELECTRONICS, INC., Taoyuan (TW)

(72) Inventors: Jih-Chi Li, Taoyuan (TW); Li-Cheng Yang, Taoyuan (TW); Wen-Cheng Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/100,959

(22) Filed: Nov. 23, 2020

(65) Prior Publication Data

US 2021/0318471 A1 Oct. 14, 2021

Related U.S. Application Data

(60) Provisional application No. 63/006,733, filed on Apr. 8, 2020.

(51) Int. Cl.
*G03B 21/20* (2006.01)
*G02B 5/02* (2006.01)
*C08L 83/04* (2006.01)

(52) U.S. Cl.
CPC ............ *G02B 5/0294* (2013.01); *C08L 83/04* (2013.01); *G02B 5/0284* (2013.01); *G03B 21/204* (2013.01)

(58) Field of Classification Search
CPC .. G03B 21/204; G02B 5/0284; G02B 5/0294; G02B 5/0242; C08L 83/02; C08L 83/06
See application file for complete search history.

(56) References Cited

U.S. PATENT DOCUMENTS

| | | | |
|---|---|---|---|
| 2012/0149810 A1* | 6/2012 | Bougherara | A61L 15/585 524/28 |
| 2016/0123557 A1 | 5/2016 | Xu et al. | |
| 2021/0114359 A1 | 4/2021 | Lee et al. | |
| 2021/0404631 A1 | 12/2021 | Xu et al. | |

FOREIGN PATENT DOCUMENTS

| | | |
|---|---|---|
| CN | 103756615 A | 4/2014 |
| TW | 200426175 A | 12/2004 |
| TW | I524130 B | 3/2016 |
| TW | 201930070 A | 8/2019 |

\* cited by examiner

*Primary Examiner* — Ryan D Howard
(74) *Attorney, Agent, or Firm* — CKC & Partners Co., LLC

(57) ABSTRACT

A wavelength converting device includes a diffused-reflecting layer, a substrate, and a photoluminescence layer. The diffused-reflecting layer has a first surface and a second surface facing away from the first surface, and the diffused-reflecting layer includes a hydrophilic binder and a lipophilic binder. The substrate is on the first surface of the diffused-reflecting layer. The photoluminescence layer is on the second surface of the diffused-reflecting layer.

10 Claims, 4 Drawing Sheets

B-B'

WAVELENGTH CONVERTING DEVICE

RELATED APPLICATION

This application claims priority to U.S. Provisional Application Ser. No. 63/006,733, filed Apr. 8, 2020, which is herein incorporated by reference in its entirety.

BACKGROUND

Field of Invention

The present disclosure relates to a wavelength converting device.

Description of Related Art

In recent years, optical projectors have been widely used in many fields and in various places, such as schools, homes, and businesses.

In one kind of the projectors, a laser light source provides first light incident on a fluorescence material to emit second light. In this regard, the fluorescence material and a reflective material are coated on a wheel, and the wheel is driven to rotate at a high speed by a motor. An image is finally formed by light reflecting from the wheel. With an increasing demand for the brightness of the optical projectors, how to make the fluorescent material and the reflective material exert a better effect has become an important issue in the present.

SUMMARY

The disclosure relates in general to a wavelength converting device.

According to some embodiments of the present disclosure, the wavelength converting device includes a diffused-reflecting layer, a substrate, and a photoluminescence layer. The diffused-reflecting layer has a first surface and a second surface facing away from the first surface, and the diffused-reflecting layer includes a hydrophilic binder and a plurality of lipophilic binders. The substrate is on the first surface of the diffused-reflecting layer. The photoluminescence layer is on the second surface of the diffused-reflecting layer.

In some embodiments of the present disclosure, a chemical structure of the hydrophilic binder includes at least one hydroxyl group, and a chemical structure of each of the lipophilic binders includes no hydroxyl group.

In some embodiments of the present disclosure, wherein each of the lipophilic binders is distributed in the diffused-reflecting layer in a form of a micro-encapsulated structure.

In some embodiments of the present disclosure, the diffused-reflecting layer further includes a plurality of reflecting particles distributed in the lipophilic binders.

In some embodiments of the present disclosure, a thermal expansion coefficient of each of the lipophilic binders mixed with the reflecting particles is between about 15 ppm and about 40 ppm.

In some embodiments of the present disclosure, a diameter of each of the lipophilic binders is between about 1 μm and about 50 μm.

In some embodiments of the present disclosure, the diffused-reflecting layer further includes a plurality of reflecting particles distributed in the hydrophilic binder.

In some embodiments of the present disclosure, based on a total weight of the diffused-reflecting layer, a content of the hydrophilic binder is between about 30 wt. % and about 45 wt. %.

In some embodiments of the present disclosure, based on a total weight of the diffused-reflecting layer, a content of the lipophilic binders is between about 5 wt. % and about 20 wt. %.

In some embodiments of the present disclosure, a viscosity of the diffused-reflecting layer is between about 10000 cp and about 100000 cp.

In the aforementioned embodiments of the present disclosure, since the wavelength converting device includes the hydrophilic binder and the lipophilic binder each distributed uniformly in the diffused-reflecting layer, abilities of the diffused-reflecting layer to withstand a high power irradiation and a large temperature difference can be enhanced, and hence the wavelength converting device can exert better optical conversion efficiency.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
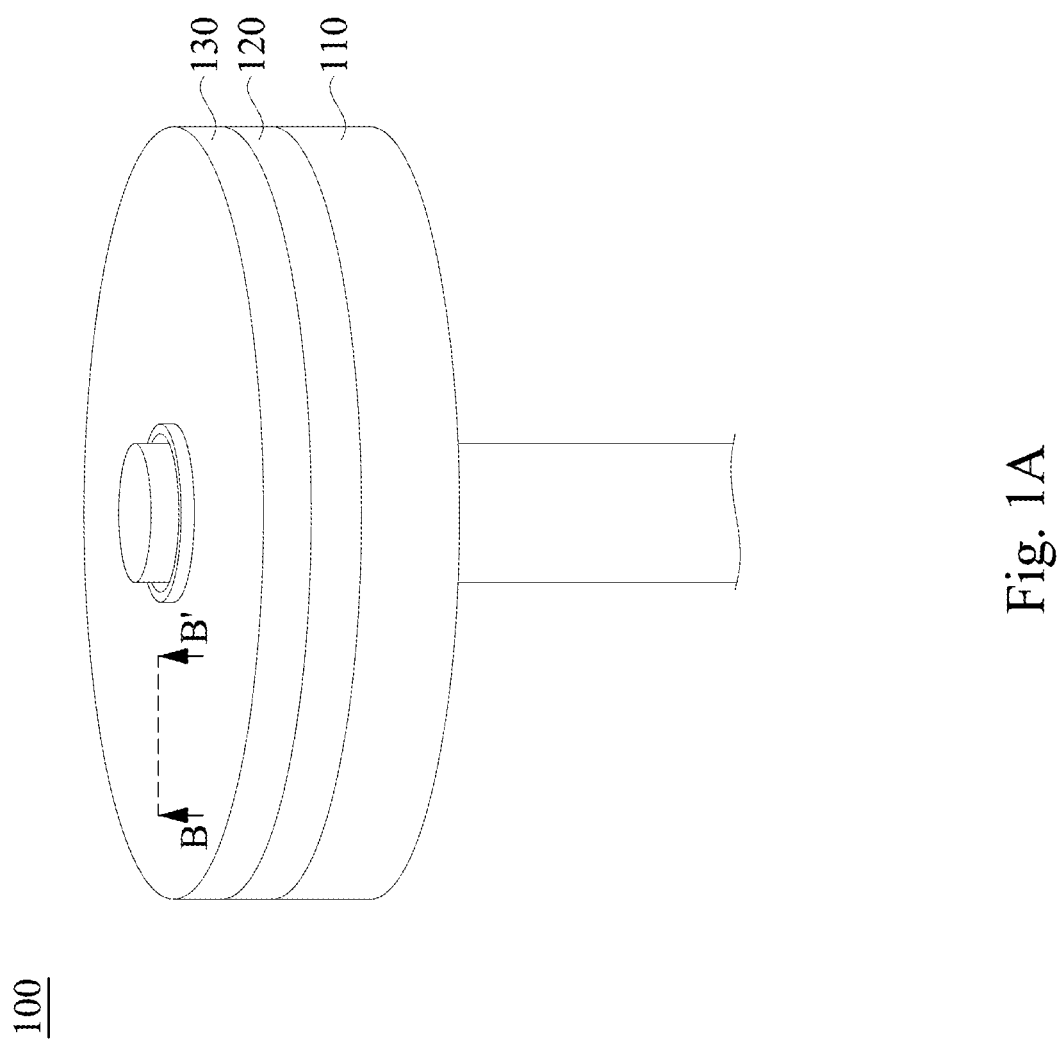
FIG. 1A is a perspective view illustrating a wavelength converting device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

As used herein, "around", "about", "approximately", or "substantially" shall generally mean within 20 percent, or within 10 percent, or within 5 percent of a given value or range. Numerical quantities given herein are approximated, meaning that the term "around", "about", "approximately", or "substantially" can be inferred if not expressly stated.

In order to enhance an optical/heat resisting property (i.e., an ability to withstand irradiation with high power) of a wavelength converting device (e.g., a phosphor wheel) and a tolerance to a large temperature difference impacted on the wavelength converting device, the present disclosure provides a wavelength converting device including a diffused-reflecting layer with two types of binders. In a configuration of the wavelength converting device, the binder of the first type is hydrophilic, while the binder of the second type is lipophilic, and the binders of the first and second types are each distributed uniformly in the diffused-reflecting layer. Accordingly, abilities of the diffused-reflecting layer to withstand a high power irradiation and a large temperature difference can be enhanced, and hence the wavelength converting device can exert better optical conversion efficiency.

Figure 1B:
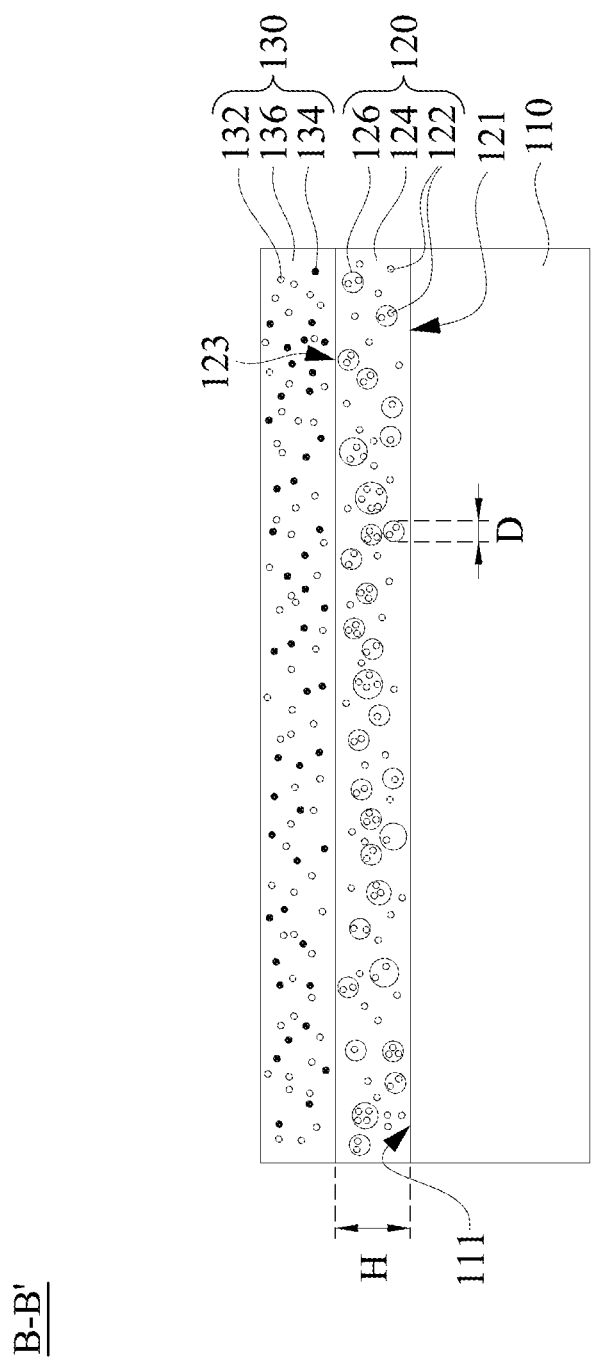
FIG. 1B is a cross-sectional view of the wavelength converting device shown in FIG. 1 along line B-B' according to some embodiments of the present disclosure.

FIG. 1A is a perspective view illustrating a wavelength converting device 100 according to some embodiments of the present disclosure. FIG. 1B is a cross-sectional view of the wavelength converting device 100 shown in FIG. 1 along line B-B' according to some embodiments of the present disclosure. Reference is made to FIG. 1A and FIG. 1B. The wavelength converting device 100 includes a substrate 110, a diffused-reflecting layer 120, and a photoluminescence layer 130. The diffused-reflecting layer 120 has a first surface 121 and a second surface 123 facing away from the first surface 121. The substrate 110 is on the first surface 121 of the diffused-reflecting layer 120, and the photoluminescence layer 130 is on the second surface 123 of the diffused-reflecting layer 120. Stated differently, the substrate 110 and the photoluminescence layer 130 are on opposite sides of the diffused-reflecting layer 120. In some embodiments, the wavelength converting device 100 is a reflective fluorescent phosphor wheel, which generates excitation light by the absorption of a light beam (e.g., laser light). In detail, the light beam is absorbed by the photoluminescence layer 130 to generate the excitation light, which is further diffusely reflected in and by the diffused-reflecting layer 120 and then emitted out of the wavelength converting device 100 for imaging. In some embodiments, the wavelength converting device 100 is connected to a motor through a driving shaft, such that the wavelength converting device 100 can be rotated when the motor drives the driving shaft to rotate.

In some embodiments, the substrate 110 may be, for example, a sapphire substrate, a glass substrate, a borosilicate glass substrate, a floating boron-silicate glass substrate, a fused quartz substrate or a calcium fluoride substrate, a ceramic substrate, an aluminum substrate, or combinations thereof. However, the materials included in the substrate 110 are not limited thereto, and the materials included in the substrate 110 can be adjusted according to actual needs. In some embodiments, a thermal expansion coefficient of the substrate 110 may be between about 20 ppm and about 100 ppm, such that the substrate 110 can withstand the light beam with high power and hence maintain its original size. In some embodiments, a surface 111 of the substrate 110 facing toward the diffused-reflecting layer 120 may further be coated with a thin reflecting layer to enhance the reflection of the light beam irradiated toward the substrate 110, or a thin protective film to prevent surface damage of the substrate 110.

In some embodiments, the diffused-reflecting layer 120 may include a plurality of reflecting particles 122 configured to diffusely reflect the excitation light excited by the photoluminescence layer 130. In some embodiments, the reflecting particles 122 may include silicon dioxide ($SiO_2$), titanium dioxide ($TiO_2$), zinc oxide (ZnO), boron nitride (BN), zirconium dioxide ($ZrO_2$), aluminum oxide ($Al_2O_3$), or combinations thereof. In some embodiments, based on a total weight of the diffused-reflecting layer 120, a content of the reflecting particles 122 is between about 40 wt. % and about 60 wt. % to exert a better reflection ability to the light beam irradiated on the diffused-reflecting layer 120, and to preserve enough space for other compositions (e.g., the binders) to be distributed in the diffused-reflecting layer 120. For example, if the content of the reflecting particles 122 is lower than about 45 wt. %, the light beam irradiated on the diffused-reflecting layer 120 may not be effectively reflected out of the wavelength converting device 100 for imaging; and if the content of the reflecting particles 122 is greater than about 55 wt. %, there may not be enough space for other compositions (e.g., the binders) to be distributed in the diffused-reflecting layer 120, and hence an optical/heat resisting property of the wavelength converting device 100 and a tolerance to a large temperature difference impacted on the wavelength converting device 100 may be poor, which will be discussed later in the following descriptions.

In some embodiments, the diffused-reflecting layer 120 may include a hydrophilic binder 124 soluble in water. The hydrophilic binder 124 is the main binder in the diffused-reflecting layer 120, and is configured to fix the reflecting particles 122 tightly in the diffused-reflecting layer 120. It is noted that the hydrophilic binder 124 does not interfere the characteristics of the incident and reflecting light (e.g., the wavelength). In some embodiments, the hydrophilic binder 124 may further be soluble in alcohol. For example, the hydrophilic binder 124 may include a water- and/or alcohol-soluble silicone resin with a chemical structure including least one hydroxyl group. Such a hydrophilic binder 124 can withstand a high temperature, so as to withstand the light beam with high power irradiated thereon. In some embodiments, based on a total weight of the diffused-reflecting layer 120, a content of the hydrophilic binder 124 is between about 30 wt. % and about 45 wt. %, such that the diffused-reflecting layer 120 can have a good optical/heat resisting property and a good tolerance to a large temperature difference impacted thereon. For example, if the content of the hydrophilic binder 124 is lower than about 30 wt. %, the diffused-reflecting layer 120 may not have an ability to withstand a high temperature; and if the content of the hydrophilic binder 124 is greater than about 45 wt. %, a content of the other binder (i.e., a lipophilic binder 126, which will be discussed later in the following descriptions) may be relatively lower, and thus the diffused-reflecting layer 120 may not have an ability to withstand a large temperature difference impacted thereon.

In some embodiments, the reflecting particles 122 is further distributed in the hydrophilic binder 124, and a thermal expansion coefficient of the hydrophilic binder 124 mixed with the reflecting particles 122 is between about 600 ppm to about 800 ppm. Accordingly, the diffused-reflecting layer 120 can have a good optical/heat resisting property and a tolerance to a large temperature difference impacted thereon. For example, if the said thermal expansion coefficient is lower than about 600 ppm, the diffused-reflecting layer 120 may not have an ability to withstand a high temperature; and if the thermal expansion coefficient is greater than about 800 ppm, the other binder (i.e., the lipophilic binder 126, which will be discussed later in the following descriptions) may not compensate a difference of the thermal expansion coefficients between the hydrophilic binder 124 and the substrate 110, thus resulting in cracking or deterioration of the diffused-reflecting layer 120, which may further lead to bad influences on the wavelength converting device 100 (e.g., an unstable quality of the wavelength converting device 100, a low brightness of the wavelength converting device 100, and a poor ability to reflect the light beam).

In some embodiments, the diffused-reflecting layer 120 may include a plurality of lipophilic binders 126 soluble in oil. In some embodiments, the lipophilic binders 126 may further be hydrophobic (i.e., non-soluble in water), which may also be referred to as "hydrophobic binders 126" that have a hydrophilic/hydrophobic characteristic different from the hydrophilic binder 124. For example, each of the lipophilic binders 126 may include an oil-soluble silicone resin with a chemical structure including no hydroxyl group. Such lipophilic binders 126 can withstand a large temperature difference impacted thereon. More specifically, the diffused-reflecting layer 120 may suffer a large temperature difference during the switching of the operation and non-operation state of the wavelength converting device 100, and since the lipophilic binders 126 are softer in structure relatively to the hydrophilic binder 124, the lipophilic binders 126 can provide an ability to withstand a large temperature difference impacted on the diffused-reflecting layer 120.

In some embodiments, based on a total weight of the diffused-reflecting layer 120, a content of the lipophilic binders 126 is between about 5 wt. % and about 20 wt. %, such that the diffused-reflecting layer 120 can have a good optical/heat resisting property and a tolerance to a large temperature difference impacted thereon. For example, if the content of the lipophilic binders 126 is lower than about 5 wt. %, the diffused-reflecting layer 120 may not have an ability to withstand a large temperature difference impacted thereon; and if the content of the lipophilic binders 126 is greater than about 20 wt. %, the content of the hydrophilic binder 124 may be relatively lower, and thus the diffused-reflecting layer 120 may not have an ability to withstand a high temperature. In preferred embodiments, the content of the lipophilic binder 126 is between about 10 wt. % and about 20 wt. %, so as to better achieve the advantages mentioned above.

Since the content of the lipophilic binders 126 is lower than the content of the hydrophilic binder 124, and the hydrophilic/hydrophobic characteristics between the lipophilic binders 126 and the hydrophilic binder 124 are different, each of the lipophilic binders 126 may be distributed in the diffused-reflecting layer 120 in a form of a micro-encapsulated structure. In other words, each of the lipophilic binders 126 may self-assemble into an encapsulated structure with a micro-level size, and the micro-encapsulated structures are tightly surrounded and covered by hydrophilic binder 124. In other words, the hydrophilic binder 124 covers the micro-encapsulated structures along the profiles of the micro-encapsulated structures. Furthermore, the lipophilic binders 126 are flexible in structure. Accordingly, the lipophilic binders 126 may be regarded as buffer structures filled in the hydrophilic binder 124, so as to be stretched and/or squeezed during the heating or cooling process, thereby enhancing the flexibility of the whole diffused-reflecting layer 120, and hence the diffused-reflecting layer 120 is able to withstand a large temperature difference impacted on thereon during the switching of the operation and non-operation state of the wavelength converting device 100. Moreover, the diffused-reflecting layer 120 including such lipophilic binders 126 may not easily break down after curing. In some embodiments, each of the lipophilic binders 126 may substantially be in a round shape, and a diameter D of each of the lipophilic binders 126 may be between about 1 μm and about 50 μm. Accordingly, the lipophilic binders 126 can be uniformly distributed in the diffused-reflecting layer 120, and thus providing an ability to withstand a large temperature difference impacted on the diffused-reflecting layer 120. For example, if the diameter D of each of the lipophilic binders 126 is smaller than about 1 μm, the lipophilic binders 126 may not be able to function as buffer structures to withstand the large temperature difference; and if the diameter D of each of the lipophilic binders 126 is larger than about 50 μm, merely one lipophilic binder 126 may occupy most of a height H of the diffused-reflecting layer 120 (e.g., the height H of the diffused-reflecting layer 120 may be about 100 μm), and hence the lipophilic binders 126 may not be uniformly distributed in the diffused-reflecting layer 120, thus resulting in a poor ability to withstand a large temperature difference impacted on the diffused-reflecting layer 120. In preferred embodiments, the diameter D of each of the lipophilic binders 126 may be between about 5 μm and about 30 μm, so as to better achieve the advantages mentioned above.

In some embodiments, the reflecting particles 122 is further distributed in the lipophilic binders 126, and a thermal expansion coefficient of each of the lipophilic binders 126 mixed with the reflecting particles 122 is between about 5 ppm and about 40 ppm. Accordingly, the diffused-reflecting layer 120 can have a good optical/heat resisting property and a tolerance to a large temperature difference impacted thereon. For example, if the said thermal expansion coefficient is lower than about 5 ppm, the diffused-reflecting layer 120 may not have an ability to withstand a high temperature; and if the thermal expansion coefficient is greater than about 40 ppm, the lipophilic binder 126 may not effectively compensate the difference of the thermal expansion coefficients between the hydrophilic binder 124 and the substrate 110, thus resulting in cracking or deterioration of the diffused-reflecting layer 120, which may further lead to bad influences on the wavelength converting device 100 (e.g., an unstable quality of the wavelength converting device 100, a low brightness of the wavelength converting device 100, and a poor ability to reflect the light beam). It is noted that since the lipophilic binder 126 includes several reflecting particles 122 therein, the lipophilic binder 126 can be regarded as being able to reflect light regardless of the lipophilic binder 126 itself does not interfere the characteristics of the incident and reflecting light (e.g., the wavelength). In some embodiments, the lipophilic binders 126 in the diffused-reflecting layer 120 may have different sizes, in which the larger lipophilic binders 126 may include more reflecting particles 122 distributed therein, while the smaller lipophilic binders 126 may include less reflecting particles 122 distributed therein. In some other embodiments, the larger lipophilic binders 126 may include less reflecting particles 122 distributed therein, while the smaller lipophilic binders 126 may include more reflecting particles 122 distributed therein.

In some embodiments, a viscosity of the diffused-reflecting layer 120 is between about 10000 cp and about 100000 cp according to the concentration of reflecting particles 122 and lipophilic binder 126. More specifically, during the manufacture of the wavelength converting device 100, a solution of the diffused-reflecting layer 120 may be coated on the surface 111 of the substrate 110 under room temperature. It should be noted that, if the viscosity of the diffused-reflecting layer 120 is lower than about 10000 cp, the coating of the diffused-reflecting layer 120 may be difficult to control due to a high liquidity of the diffused-reflecting layer 120; and if the viscosity of the diffused-reflecting layer 120 is greater than about 100000 cp, the coating of the diffused-reflecting layer 120 may be difficult to perform due to a low liquidity of the diffused-reflecting layer 120.

In some embodiments, the photoluminescence layer 130 may include optical particles 132 configured to enhance the diffused reflection of the excitation light. In some embodiments, the characteristics of the optical particles 132 distributed in the photoluminescence layer 130 may be substantially identical to those of the reflecting particles 122 distributed in the diffused-reflecting layer 120, which will not be repeated hereinafter. In some embodiments, the photoluminescence layer 130 may include a plurality of phosphors 134, such as silicate phosphors, nitride phosphors, $Y_3Al_5O_{12}$ (YAG), $Tb_3Al_5O_{12}$ (TAG), or $Lu_3Al_5O_{12}$ (LuAG) phosphors with garnet structures, or combinations thereof. In some embodiments, based on a total weight of the photoluminescence layer 130, a content of the phosphors 134 is between about 65 wt. % and about 85 wt. %, so as to effectively convert the light beam irradiated on the photoluminescence layer 130 into the excitation light. For example, if the content of the phosphors 134 is lower than about 65 wt. %, the light beam may not be effectively converted; and if the content of the phosphors 134 is greater than about 75 wt. %, the phosphors 134 may be difficult to be fixed on the substrate 110.

In some embodiments, the photoluminescence layer 130 may include a binder 136. The binder 136 can fix the optical particles 132 and the phosphors 134 to the substrate 110. In some embodiments, the binder 136 may be a hydrophilic binder which is soluble in water. In further embodiments, the characteristics of the binder 136 distributed in the photoluminescence layer 130 may be substantially identical to those of the hydrophilic binder 124 distributed in the diffused-reflecting layer 120, which will not be repeated hereinafter. In addition, the binder 136 can protect the optical particles 132 and the phosphors 134, thereby preventing precipitation of the optical particles 132 and the phosphors 134, and hence improve the overall optical quality of the wavelength converting device 100. In some embodiments, based on a total weight of the photoluminescence layer 130, a content of the binder 136 is between about 15 wt. % and about 35 wt. %, such that the optical particles 132 and the phosphors 134 can be stably fixed on the substrate 110. For example, if the content of the binder 136 is lower than about 25 wt. %, the optical particles 132 and the phosphors 134 may be difficult to be fixed on the substrate 110; and if the content of the binder 136 is greater than about 35 wt. %, there may not be enough space for the optical particles 132 and the phosphors 134 to be distributed in the photoluminescence layer 130.

Hereinafter, the features of the present disclosure will be described more specifically with reference to the wavelength converting devices of some comparative examples and some embodiments of the present disclosure. It should be noted that without exceeding the scope of the present disclosure, the materials used, quality and ratio, processing details, and processing procedures may be changed as appropriate. Therefore, the present disclosure should not be interpreted restrictively by the wavelength converting devices of the embodiments described below. The compositions and the ratio of each of the compositions in the wavelength converting devices of the comparative examples and the embodiments are listed in Table 1 reproduced below. The diffused-reflecting layer of each comparative examples and embodiments is coated on the substrate and cured under a temperature of about 200° C., and the photoluminescence layer of each comparative examples and embodiments is coated on the diffused-reflecting layer under a temperature of about 200° C.

TABLE 1

| | | comparative example 1 | comparative example 2 | embodiment 1 | embodiment 2 |
|---|---|---|---|---|---|
| substrate | | aluminum | aluminum | aluminum | aluminum |
| diffused-reflecting layer | reflecting particles (TiO$_2$) | 50 wt. % | 50 wt. % | 50 wt. % | 50 wt. % |
| | hydrophilic binder | 50 wt. % | 10 wt. % | 40 wt. % | 30 wt. % |
| | lipophilic binder | 0 wt. % | 40 wt. % | 10 wt. % | 20 wt. % |

TABLE 1-continued

| | | comparative example 1 | comparative example 2 | embodiment 1 | embodiment 2 |
|---|---|---|---|---|---|
| photoluminescence layer | hydrophilic binder | 30 wt. % | 30 wt. % | 30 wt. % | 30 wt. % |
| | phosphors (YAG) | 70 wt. % | 70 wt. % | 70 wt. % | 70 wt. % |

Firstly, each of the wavelength converting devices of the comparative examples and the embodiments is tested under a large temperature difference. More specifically, each of the wavelength converting devices is placed in an environment having an initial temperature of about 300° C., and then the temperature is instantly dropped to about 25° C. The testing results show that the diffused-reflecting layer in the wavelength converting device of comparative example 1 results in peeling and cracking, while the diffused-reflecting layers in the wavelength converting devices of comparative example 2, embodiment 1, and embodiment 2 are well kept in their original states without peeling and cracking. It can be seen that since the wavelength converting devices of comparative example 2, embodiment 1, and embodiment 2 include the lipophilic binders in their diffused-reflecting layers, the wavelength converting devices of comparative example 2, embodiment 1, and embodiment 2 can withstand a large temperature difference impacted thereon.

Figure 2:
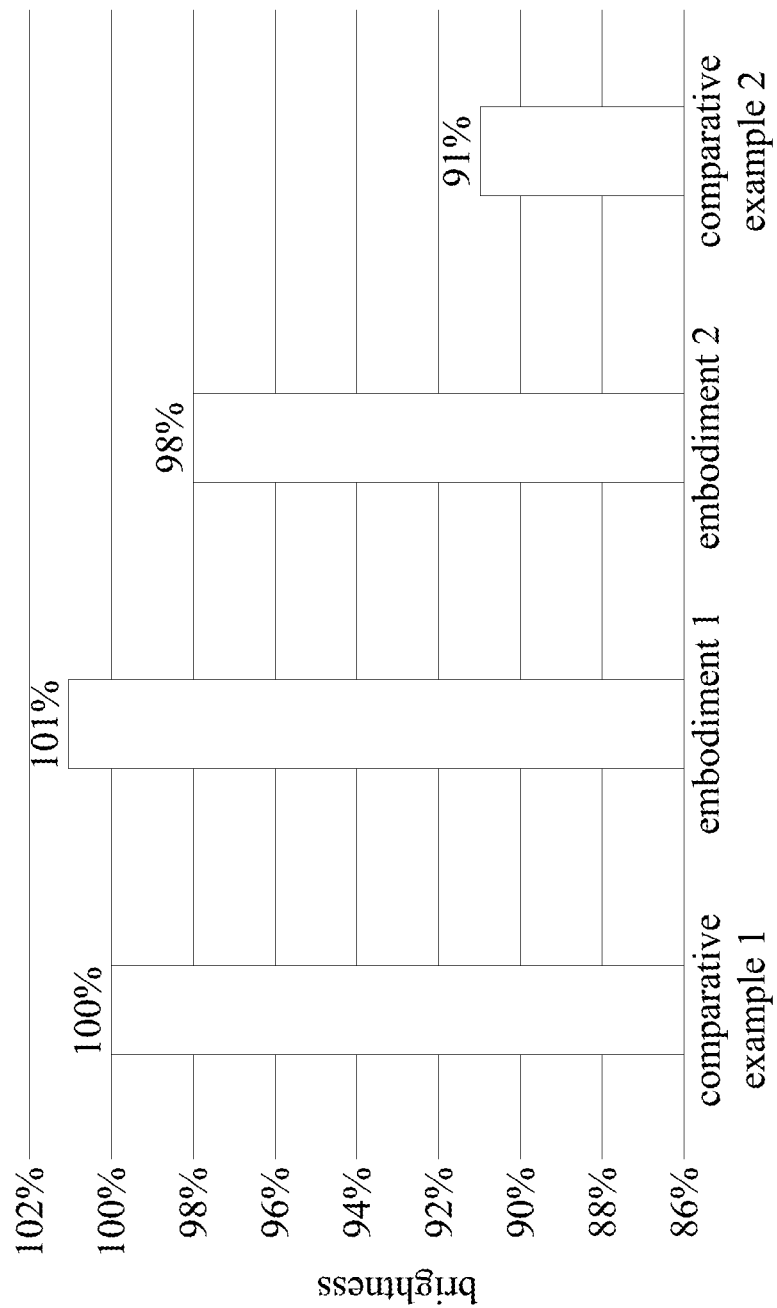
FIG. 2 is a schematic diagram illustrating the brightness of the excitation light reflected by the wavelength converting devices of some comparative examples and some embodiments of the present disclosure.

Next, a brightness of an excitation light reflected by each of the wavelength converting devices of the comparative examples and the embodiments is measured. More specifically, each of the wavelength converting devices is irradiated by a light beam with a power of about 450 W, and a luminous flux ratio of the excitation light to the incident light, which is also referred to as the "brightness" hereinafter, is then measured. FIG. 2 is a schematic diagram illustrating the brightness of the excitation light reflected by the wavelength converting devices of some comparative examples and some embodiments of the present disclosure. Reference is made to Table 1 and FIG. 2. The results show that the brightness of the excitation light reflected by the wavelength converting devices of embodiments 1 and 2 are respectively about 101% and about 98%, which are nearly 100%. It can be seen that the wavelength converting devices of embodiments 1 and 2 exert good optical conversion efficiency. On the other hand, the brightness of the excitation light reflected by the wavelength converting device of comparative example 2 is about 91%, which is relatively lower. This is due to the content of the lipophilic binder in the diffused-reflecting layer. In detail, since the content of the lipophilic binder is greater than about 20 wt. %, the content of the hydrophilic binder may be relatively lower, and thus the diffused-reflecting layer may not have an ability to withstand a high temperature, thus resulting in a poor ability to reflect the light beam, as shown in FIG. 2.

Figure 3B:
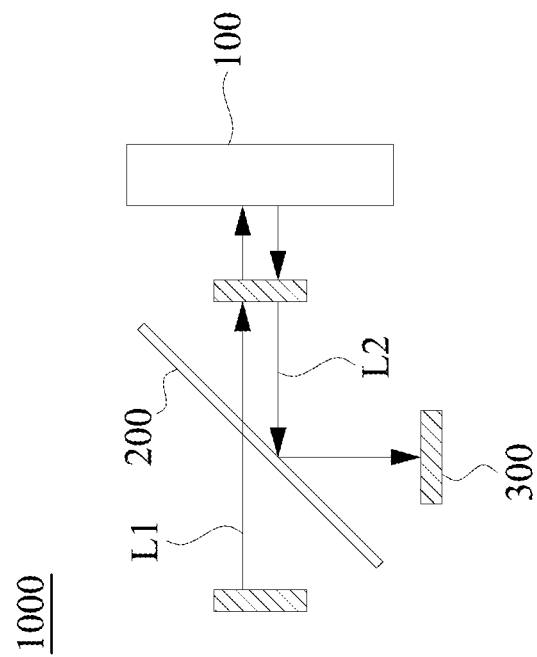
FIG. 3B is a schematic diagram illustrating a wavelength converting device applied to an optical module according to some other embodiments of the present disclosure.
Figure 3A:
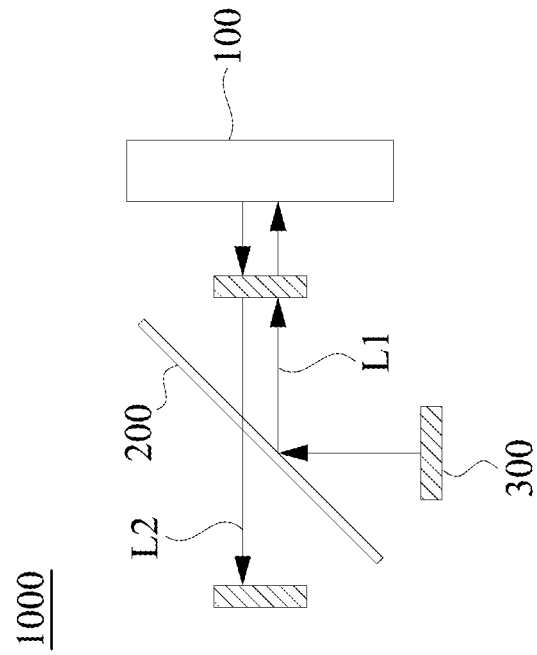
FIG. 3A is a schematic diagram illustrating a wavelength converting device applied to an optical module according to some embodiments of the present disclosure.

FIG. 3A is a schematic diagram illustrating a wavelength converting device 100 applied to an optical module 1000 according to some embodiments of the present disclosure. FIG. 3B is a schematic diagram illustrating a wavelength converting device 100 applied to an optical module 1000 according to some embodiments of the present disclosure. Reference is made to FIG. 3A and FIG. 3B. The optical module 1000 includes the wavelength converting device 100, a dichroic filter 200, and a plurality of light-guiding units 300. The wavelength converting device 100 is configured to convert a incident laser light beam L1 into an excitation light beam L2. The dichroic filter 200 is configured to achieve the distribution of the incident laser light beam L1 and the excitation light beam L2. In some embodiments, the dichroic filter 200 may be a neutral density filter (ND filter), but the present disclosure is not limited in this regard. The light-guiding units 300 are configured to guide the incident laser light beam L1 and the excitation light beam L2 passing there through. In some embodiments, the light-guiding units 300 may be optical lens, but the present disclosure is not limited in this regard. In some embodiments, at least one of the light-guiding units 300 may be placed between the wavelength converting device 100 and the dichroic filter 200. The dichroic filter 200 illustrated in FIG. 3A may let the incident laser light beam L1 to pass there through, and may further reflect the excitation light beam L2 reflected by the wavelength converting device 100. On the other hand, the dichroic filter 200 illustrated in FIG. 3B may reflect incident the laser light beam L1, and may further let the excitation light beam L2 reflected by the wavelength converting device 100 to pass there through.

According to the aforementioned embodiments of the present disclosure, since the wavelength converting device includes the diffused-reflecting layer with the hydrophilic and lipophilic binders each distributed uniformly therein, abilities of the diffused-reflecting layer to withstand a high-power irradiation and a large temperature difference can be enhanced, and hence the wavelength converting device can exert better optical conversion efficiency. Compared to the conventional wavelength converting device with only one type of binder (i.e., hydrophilic binder), the wavelength converting device with two types of the binders of the present disclosure may not easily break down during heating or cooling process or after curing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A wavelength converting device, comprising:
   a diffused-reflecting layer having a first surface and a second surface facing away from the first surface, wherein the diffused-reflecting layer comprises a hydrophilic binder and a plurality of lipophilic binders;
   a substrate on the first surface of the diffused-reflecting layer; and
   a photoluminescence layer on the second surface of the diffused-reflecting layer.

2. The wavelength converting device of claim 1, wherein a chemical structure of the hydrophilic binder comprises at least one hydroxyl group, and a chemical structure of each of the lipophilic binders comprises no hydroxyl group.

3. The wavelength converting device of claim 1, wherein each of the lipophilic binders are distributed in the diffused-reflecting layer in a form of a micro-encapsulated structure.

4. The wavelength converting device of claim 3, wherein the diffused-reflecting layer further comprises a plurality of reflecting particles distributed in the lipophilic binders.

5. The wavelength converting device of claim 4, wherein a thermal expansion coefficient of each of the lipophilic binders mixed with the reflecting particles is between about 15 ppm and about 40 ppm.

6. The wavelength converting device of claim 3, wherein a diameter of each of the lipophilic binders is between about 1 μm and about 50 μm.

7. The wavelength converting device of claim 1, wherein the diffused-reflecting layer further comprises a plurality of reflecting particles distributed in the hydrophilic binder.

8. The wavelength converting device of claim 1, wherein based on a total weight of the diffused-reflecting layer, a content of the hydrophilic binder is between about 30 wt. % and about 45 wt. %.

9. The wavelength converting device of claim 1, wherein based on a total weight of the diffused-reflecting layer, a content of the lipophilic binders is between about 5 wt. % and about 20 wt. %.

10. The wavelength converting device of claim 1, wherein a viscosity of the diffused-reflecting layer is between about 10000 cp and about 100000 cp.

* * * * *